March 22, 1966  M. STAND  3,242,246
METHOD OF PREPARING POLYTETRAFLUOROETHYLENE ARTICLES
Filed June 14, 1963
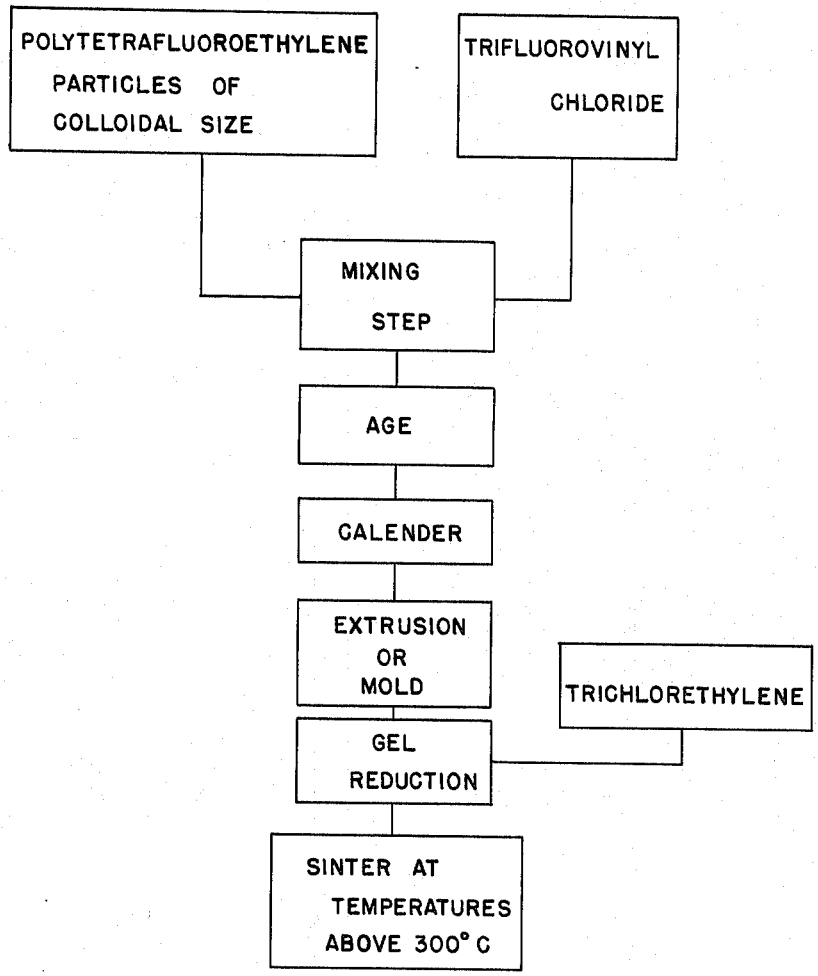

3,242,246
**METHOD OF PREPARING POLYTETRAFLUORO-
ETHYLENE ARTICLES**
Mille Stand, Bronx, N.Y., assignor to Sealectro
Corporation, Mamaroneck, N.Y.
Filed June 14, 1963, Ser. No. 287,797
8 Claims. (Cl. 264—127)

This invention relates to a method of preparing improved polytetrafluoroethylene articles. It has particular reference to a method of forming polytetrafluoroethylene articles having superior strength and higher resiliency.

Heretofore, useful articles have been molded or extruded by forming dies maintained at a high temperature, generally in excess of 300° C. Other prior art methods of forming articles of this material included a prebaking step at temperatures in excess of 400° C. Various other processes have been described, all of which use a prebaking step in which finely ground polytetrafluoroethylene is heated to temperatures of 300° C. to 500° C. before forming.

One of the objects of this invention is to provide an improved method of forming articles of polytetrafluoroethylene which avoids one or more of the disadvantages and limitations of prior art methods.

Another object of the invention is to form polytetrafluoroethylene articles by a process which requires no heating except during the final sintering step.

Another object of the invention is to form plastic articles by first forming a gel which can be easily worked and easily extruded through a die.

The mixture used in the forming methods described herein is called a gel. A gel may be defined as a finely divided solid mixed with a liquid. This solid may be induced to form a gel with the liquid in which the particles are partially soluble. The formation of a gel is, therefore, a solvent effect.

The invention comprises the steps of mixing powdered polytetrafluoroethylene in a solvent to form a gel. The gel is calendered by passing it through rolls and then extruded through a die to form lengths of fibers. The gel may be pressed into a mold to form articles of a predetermined shape. The solvent is then removed from the gel and the article is finally sintered in a furnace at about 370 degrees centigrade.

Other and further objects and advantages of the invention will become apparent from the following detailed description taken in connection with the drawing which indicates the steps in the process.

The polytetrafluoroethylene having a particle size of 100 to 1,000 microns is mixed with trifluorovinyl chloride in a blender with one part solid to 15 parts solvent. After standing for several minutes the excess solvent is decanted and the resultant mass aged from 1 to 7 days. It has been found that the aging step can be eliminated but the aging step improves the facility for extruding and molding. The material is now a pliant solid mass which can be cut into sections and handled easily.

The gel is next calendered by passing repeatedly through rolls and by the usual cross-cutting and folding process generally used in the treatment of rubber compositions and related substances. This calendering process produces a more homogeneous structure.

The gel material is now ready for extruding or molding. The usual structures, common to rubber and plastic processes, can be used. The gel may be injection molded, blow molded, or formed by well-known vacuum techniques.

After the molding or extruding step, the articles are immersed in a bath of a solvent which dissolves the trifluorovinyl chloride and thereby reduces the gel to a solid. Such a solvent may be trichloroethylene.

The articles are next sintered in a furnace which is raised slowly from room temperature to 370° centigrade. The sintering furnace may be of the muffle type in which heat zones are spaced along the furnace area. The rate at which the articles pass through the furnace depends upon their volume and shape. For small articles a sintering time of one hour is sufficient.

After sintering, if the article is desired to have maximum flexibility, it may be annealed by a gradual reduction of its temperature. If the article is desired to be stiff and possesses less resilient qualities it may be quenched by action with a suitable liquid.

It should be noted that the only heating step in the above described process is the last or sintering step. All other steps are made at room temperature.

The polytetrafluoroethylene gel may be injection moulded, because of its flow characteristics. This process may be carried out at room temperature, which is a departure from conventional procedures using thermoplastic polymers.

The moulded articles must be treated with a solvent to dissolve out the trifluorovinyl chloride. The solvent may be the same as described above for extruded articles. The sintering may also be performed as described above for extruded articles.

Blow moulding is an extension of both the extrusion and injection moulding processes. Again, because of its peculiar flow characteristics the polytetrafluoroethylene gel lends itself to producing various shaped articles by this process using the comparison technique. The departure from conventional methods is that blow moulding is done at room temperature. Solvent treatment and sintering may be carried out as described above.

For vacuum forming, conventional techniques may be applied. Solvent treatment and sintering are carried out as described above. The flow characteristics and structural strength of the polytetrafluoroethylene gel allow vacuum forming techniques to be used successfully.

Polytetrafluoroethylene articles which may be produced according to the invention include sheets, tapes, films, filaments, rods, tubing, pipes, and channels as well as mouldings of any desired shape.

The following examples illustrate the invention.

*Example I*

10 g. of polytetrafluoroethylene having an average particle size of 40 mesh (420 microns) and 100 g. of trifluorovinyl chloride having a viscosity of 350 centipoises at 20° C. were thoroughly mixed in a high speed mixer to ensure wetting of the particles for 5 to 10 minutes by which time the polytetrafluoroethylene had begun to swell. Excess liquid was decanted and the remaining material calendered. The calendering process removed more of the liquid until a pliable, putty-like, substance suitable for moulding was produced. This material contained 50 to 90% polytetrafluoroethylene.

The mixing stage should not be carried on too long or a fibrous substance is produced. Similarly overcalendering produces a product which is unsuitable for moulding.

*Example II*

A gel containing 50 to 90% of polytetrafluoroethylene was prepared from 20 g. of polytetrafluoroethylene having an average particle size of 60 mesh (U.S. standard sieve) and 80 g. of trifluorovinyl chloride having a viscosity of 150 centipoises at 20° C. by following the procedure of Example I. The gel was suitable for moulding.

As many apparently different embodiments of this invention may be made without departing from the spirit and scope thereof, it is to be understood that the inven-

What I claim is:

1. A method of preparing polytetrafluoroethylene articles which comprises the following steps: mixing polytetrafluoroethylene particles with trifluorovinyl chloride to form a gel, calendering the resulting mixture to produce a more homogeneous mass, forming articles from the gel, dipping the formed articles into a solvent which dissolves the trifluorovinyl chloride to reduce the gel to a solid, and then sintering the articles in a furnace at a temperature which is in excess of 300 degrees centigrade.

2. A method of preparing polytetrafluoroethylene articles which comprises the following steps: mixing polytetrafluoroethylene particles of a size within the range of 100 to 1,000 microns with trifluorovinyl chloride in the proportions of 5 to 10 percent of the particles by weight to form a gel, after blending the excess trifluorovinyl chloride is decanted and the gel is aged for a period of one to seven days, calendering the gel to produce a homogeneous mass, forming articles of the gel, dipping the articles so formed into trichloroethylene to remove the trifluorovinyl chloride and thereby reduce the gel to a solid, and then sintering in a furnace at a temperature in excess of 300 degrees centigrade.

3. A method as claimed in claim 2 wherein said sintering step includes the gradual increase from room temperature to 300 degrees centigrade.

4. A method as claimed in claim 2 wherein said forming process includes the use of an extrusion die.

5. A method as claimed in claim 2 wherein said forming process includes the use of a shaped mold.

6. A method of preparing polytetrafluoroethylene articles which comprises the following steps: mixing polytetrafluoroethylene particles with trifluorovinyl chloride to form a gel, calendering the resulting gel through rolls to produce a more homogeneous mass, forming articles of the mass, dipping the formed articles into a solvent which dissolves the trifluorovinyl chloride to reduce the gel and leave only the polytetrafluoroethylene, and then sintering the articles in a furnace which gradually increases from room temperature to a temperature in excess of 300 degrees centigrade.

7. A method as claimed in claim 6 wherein said forming process includes injection into a mold.

8. A method as claimed in claim 6 wherein said calendering process includes repeated passage of the gel through power rolls after cross-cutting and folding sections of the rolled mass.

References Cited by the Examiner

UNITED STATES PATENTS

| | | | |
|---|---|---|---|
| 2,600,802 | 6/1952 | Passino | 260—92.1 XR |
| 2,617,151 | 11/1952 | Rubin | 264—127 |
| 2,792,377 | 5/1957 | Miller | 260—92.1 XR |
| 3,004,294 | 10/1961 | Richard et al. | 264—127 XR |
| 3,038,870 | 6/1962 | Schott | 264—127 XR |
| 3,065,214 | 11/1962 | Rose | 260—92.1 |
| 3,076,765 | 2/1963 | West et al. | 260—92.1 XR |
| 3,202,733 | 8/1965 | Strauss | 264—127 XR |

FOREIGN PATENTS

| | | |
|---|---|---|
| 221,297 | 5/1959 | Australia. |
| 838,043 | 6/1960 | Great Britain. |

ALEXANDER H. BRODMERKEL, *Primary Examiner.*

P. E. ANDERSON, *Assistant Examiner.*